Jan. 22, 1924.
C. DE-FELICE
1,481,314
APPARATUS FOR AND PROCESS OF MAKING ARTIFICIAL FRUITS
Filed Jan. 22, 1920    5 Sheets-Sheet 1
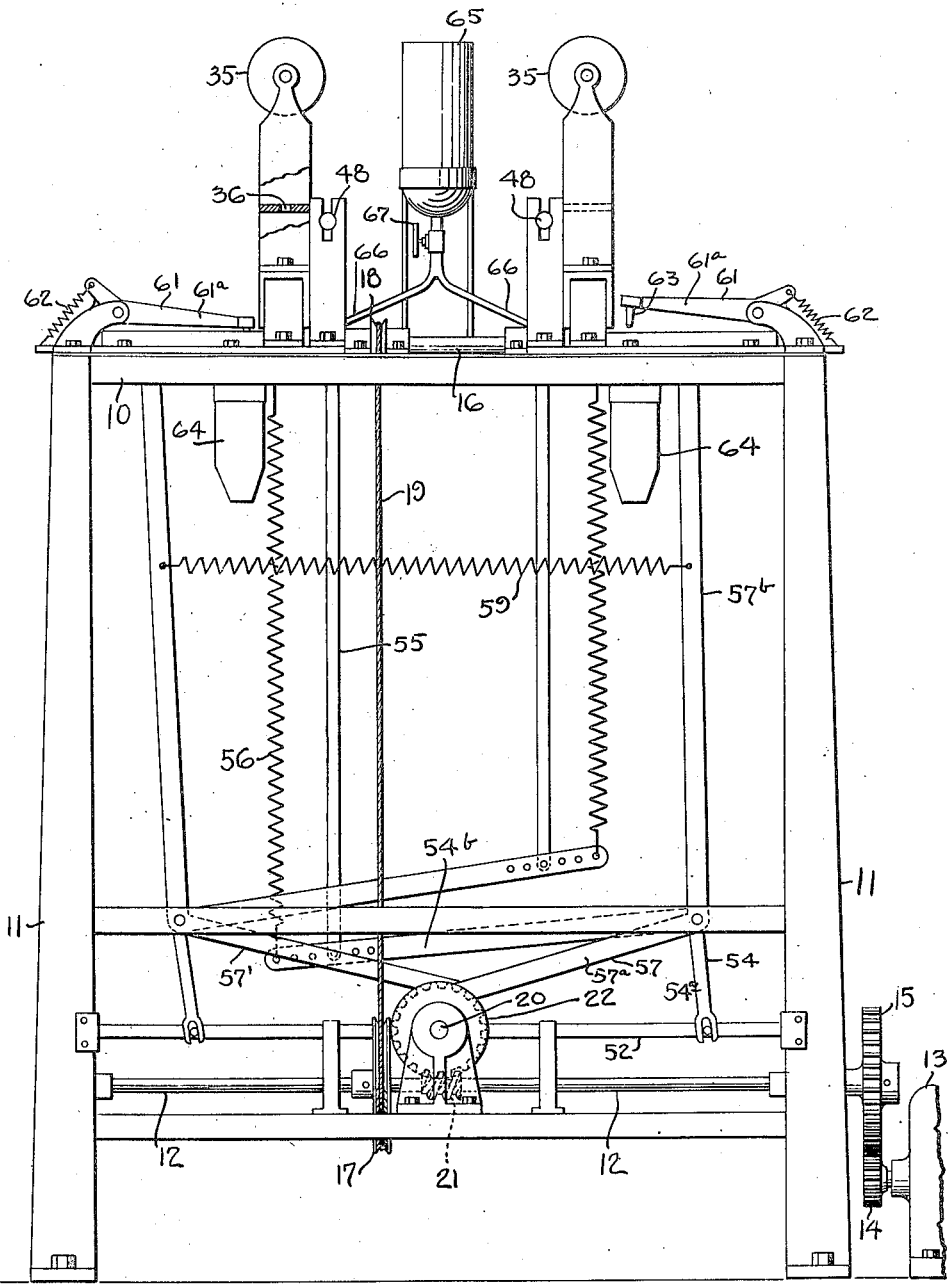
INVENTOR
Carlo De-Felice
BY
H. H. Dyke
ATTORNEY

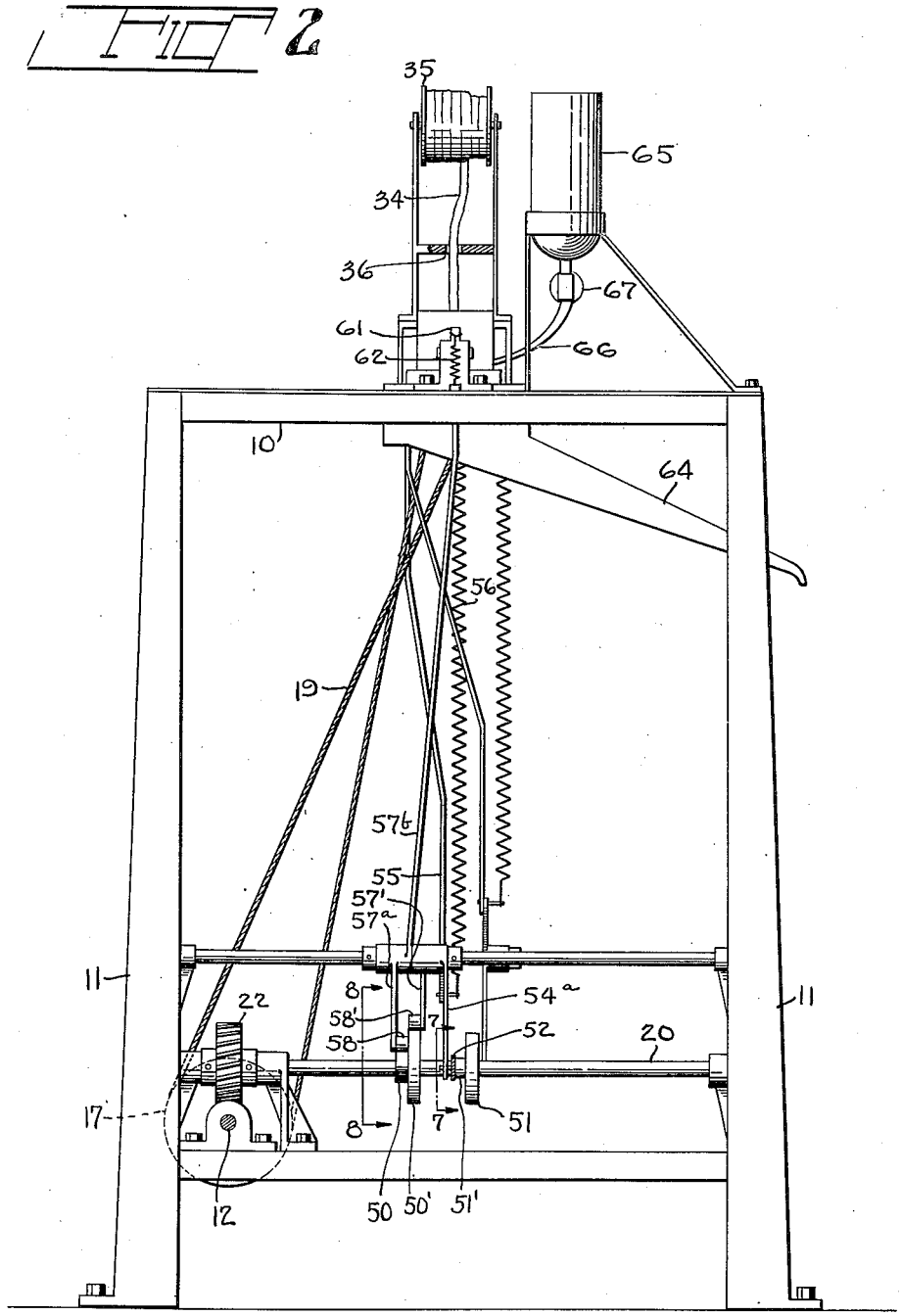

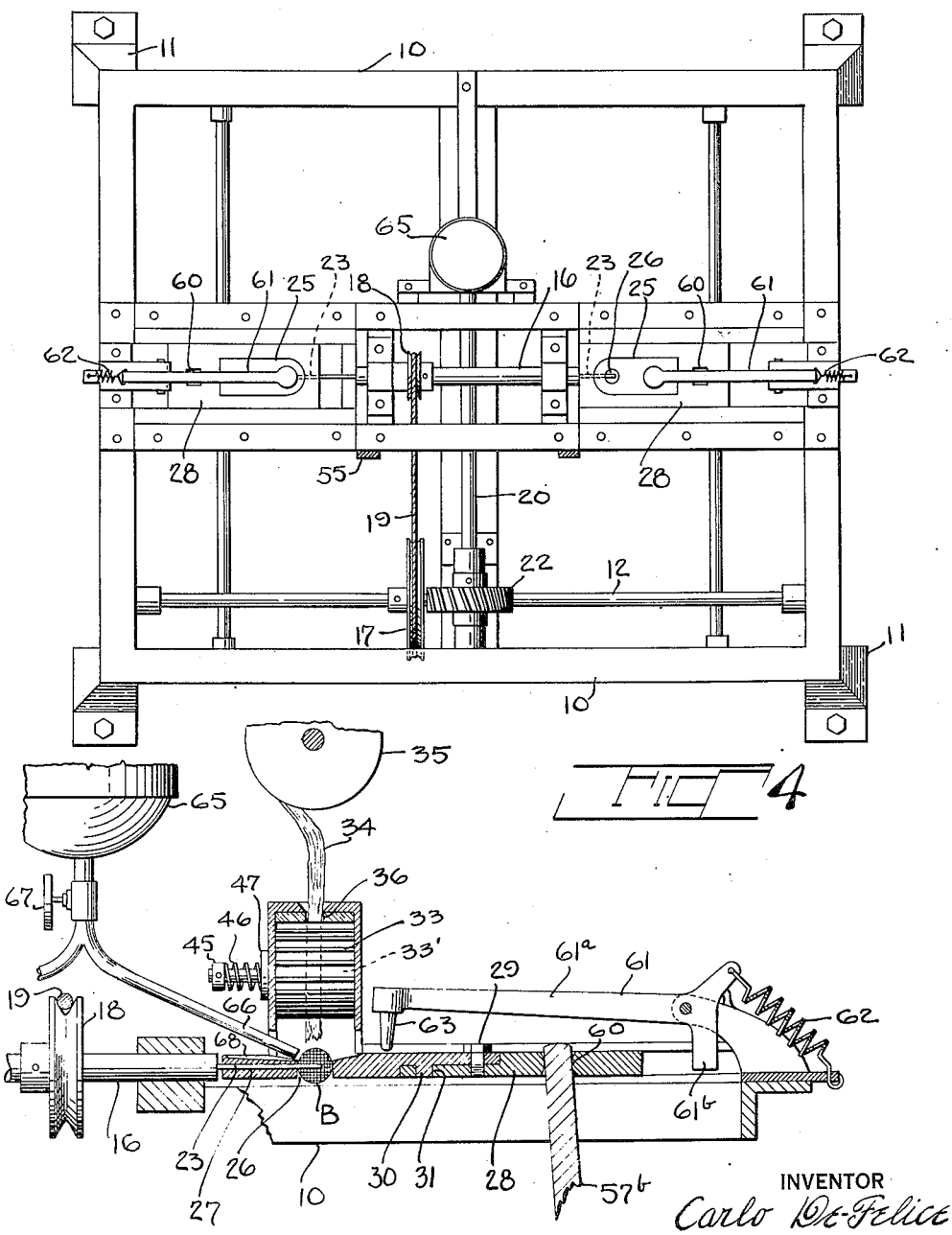

Jan. 22, 1924.                                               1,481,314
                        C. DE-FELICE
       APPARATUS FOR AND PROCESS OF MAKING ARTIFICIAL FRUITS
                    Filed Jan. 22, 1920         5 Sheets-Sheet 4
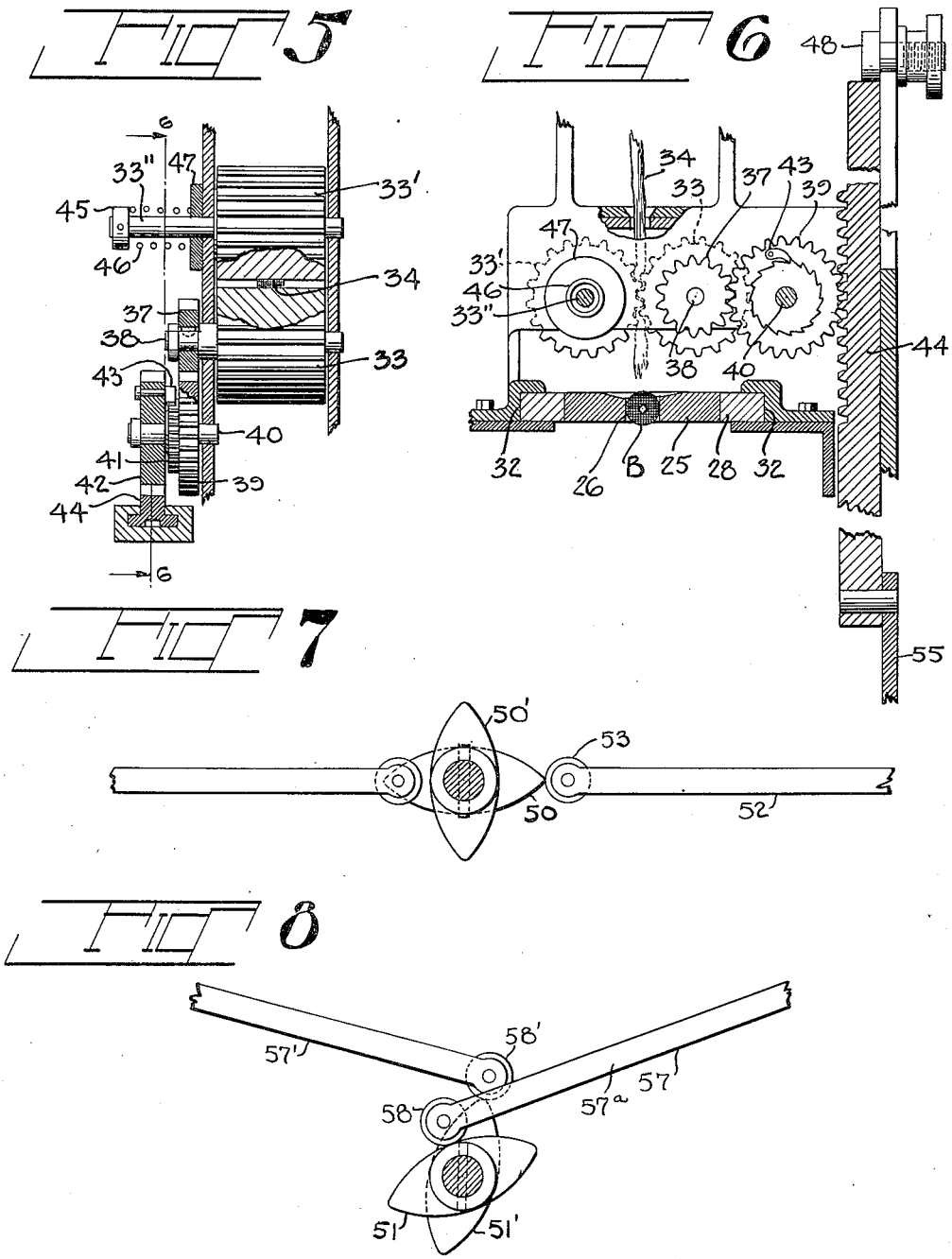
INVENTOR
Carlo De-Felice
BY
H. H. Dyke
ATTORNEY Jan. 22, 1924.
C. DE-FELICE
1,481,314
APPARATUS FOR AND PROCESS OF MAKING ARTIFICIAL FRUITS
Filed Jan. 22, 1920    5 Sheets-Sheet 5
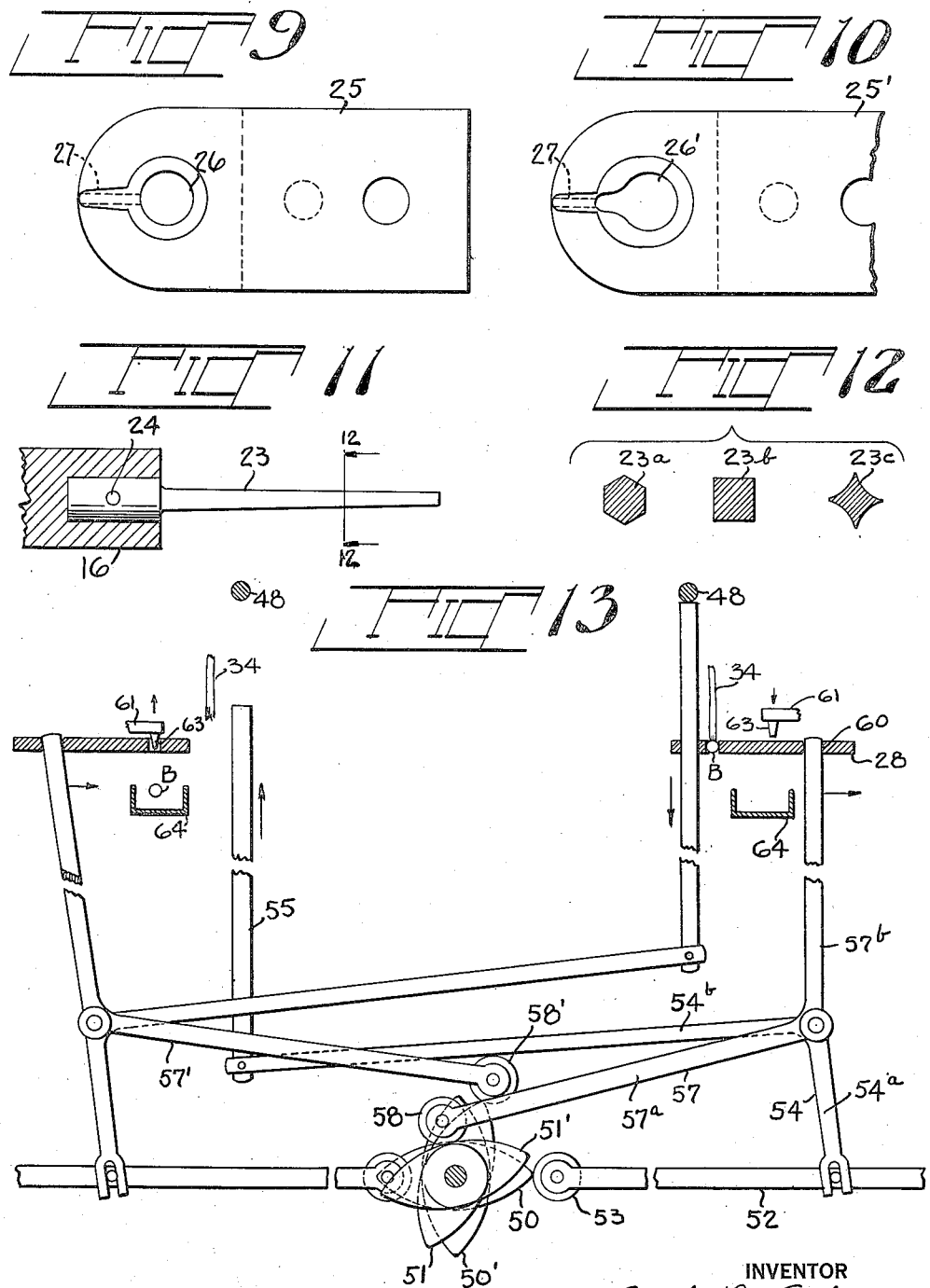
INVENTOR
Carlo De-Felice
BY
H. H. Dyke
ATTORNEY Patented Jan. 22, 1924.

1,481,314

UNITED STATES PATENT OFFICE.

CARLO DE-FELICE, OF NEW YORK, N. Y., ASSIGNOR TO H. N. McMENIMEN, OF SCOTCH PLAINS, NEW JERSEY.

APPARATUS FOR AND PROCESS OF MAKING ARTIFICIAL FRUITS.

Application filed January 22, 1920. Serial No. 353,201.

*To all whom it may concern:*

Be it known that I, CARLO DE-FELICE, a citizen of the United States, and a resident of the borough of Manhattan, city, county, and State of New York, have invented certain new and useful Improvements in Apparatus for and Processes of Making Artificial Fruits, of which the following is a specification.

My invention relates to an apparatus for and process of making globular bodies, herein referred to for convenience as balls, of fibrous material. One of the important fields of application of the invention is in the making of artificial fruit from cotton.

The cotton is fed to a rotating spindle turning in an opening in a die or plate having the outline of the longitudinal cross-section of the fruit to be made, and supplied with cementitious material as a glue solution.

A principal object of the invention is the provision of automatic apparatus for this purpose, greatly increasing the production and decreasing the cost and making it possible for one operator to take care of a number of machines.

Other objects include the provision of a movable die, adapted to be moved to and away from a stationary rotating spindle.

Another object consists in the provision of adjustable means for feeding the cotton or other fibrous material to the rotating spindle, and when set to provide the correct amount or quantity for the particular ball which is being made, the feed is uniform, and the correct amount of material being fed for each ball, the balls produced are a uniform product.

Another object consists in the provision of automatic ejecting means for discharging the finished balls.

The invention also consists in a novel process of making balls of fibrous material, which includes the step of feeding the material in a cord or roll to the spindle and utilizing the power supplied by the spindle to break or tear off the requisite amount of material when the feed is stopped, whereby when the feed is recommenced the shredded or torn ends of the fibrous material are presented to the rotating spindle and are readily engaged thereby.

Other objects of the invention will appear in connection with the following description.

In the accompanying drawings, Fig. 1 is a front view of a preferred form of apparatus. Fig. 2 is a side view thereof; Fig. 3 is a plan view thereof with parts removed; Figs. 4, 5 and 6, are sectional detail views; Fig. 6 being taken on the line 6—6, Fig. 5; Figs. 7 and 8 are diagrammatical views of cam mechanism; Figs. 9 and 10 are plan views of die plates; Fig. 11 is a side view of the ball forming spindle; Fig. 12 is a cross-sectional view taken on line 12—12, Fig. 11, and showing several forms of spindles, and Fig. 13 is a diagrammatical view showing the operation of the cams.

The machine bed 10, in the form shown, is of skeleton form and is supported on legs 11.

The drive shaft 12 extends across the machine base and is driven from any suitable source of power, as the motor 13, the drive being transmitted by reduction gears 14, 15. The spindle shaft 16 is driven at high speed from shaft 12, as by means of pulley wheels, 17 and 18, and belt 19. The cam shaft 20 is driven from shaft 12 as by means of the worm 21 on shaft 12 meshing with worm gear 22 on cam shaft 20. Cams on shaft 20 control the cotton feeding and ball ejecting mechanisms. The drive arrangement just described is a convenient one, but various other constructions may be used, as will be readily understood.

One pair of spindles and related parts is shown in the drawings, for purposes of illustration, and same are arranged to operate in alternation, but it will be understood that the arrangement and number of spindles in the machine may be varied as desired.

Spindle shaft 16 has the spindle 23 secured therein in any desired manner, as by pin 24. The spindle preferably has an angular cross-section, particularly at or near the end, whereby the fibrous material is more readily engaged and firmly held when wound thereon. Hexagonal form 23$^a$, square form 23$^b$, and diamond form 23$^c$, are shown for illustration in Fig. 12. The spindle 23 is staionary and rotates at high speed with shaft 16.

The die plates as 25, 25', Figs. 9 and 10, are provided with openings determining the form and size of the balls desired to be made. With the approximately circular opening 26 of Fig. 9, for example, balls having substantially the shape of a cherry may be produced, while with the opening 26' of Fig. 10, they will be approximately pear-shaped, and balls of various other forms may be produced by providing openings of appropriate form in the die plates. The die plates are provided with a bore 27 leading to the stem end of the ball and through which the spindle 23 may be passed.

The die plates are removably held in a suitable member adapted to be moved toward and away from the spindle 23.

In the form shown, the dies 25 are held in slide 28, being removably secured thereto by screw 29, and stud 30 on the die 25 entering the socket 31, provided in the slide 28 for receiving same.

Slide 28 is received and guided in guide ways 32. The slide 28 is reciprocated by suitable means which will be described hereafter.

Means are provided for feeding the cotton or other fibrous material to spindle 23 when same is in the position shown in Fig. 4 with spindle 23 extending within the die opening 26 and preferably nearly but not quite across the said opening.

In the form shown, such means comprise the feed gears 33, 33' between which the roll or cord 34 of cotton or other fibrous material is passed. The size or diameter of the cord or roll 34 may be varied, if desired, for production of larger or smaller balls, but, for small changes in size of ball, it is sufficient to adjust the feed, without changing the size of cord or roll used. The roll of cotton is supplied from a suitable source, as a spool 35, and may be guided between the gears 33, 33' by being passed through the guide opening 36.

Gear 33' is driven from gear 33.

Gear 33 is driven by pinion 37, fast on the gear shaft 38, and pinion 37 is in turn actuated by pinion 39, which turns on stub shaft 40. Ratchet wheel 41 is fast to pinion 39. The rack pinion 42 also turns on shaft 40 and carries a pawl 43, adapted to actuate the ratchet wheel and gear train, when moved in one direction, and riding freely thereover when pinion 42 is turned in the opposite direction by rack 44, which engages therewith.

Friction means are provided for preventing backward movement of gears 33, 33' and in the form shown shaft 33" of feed gear 33' is provided with a collar 45, which serves to compress the spring 46 against the fibre washer 47, and serves to prevent such backward rotation of the feed gears, but the frictional opposition to turning is not sufficient to interfere with the rotation thereof in feeding.

An adjustable stop 48 serves to limit the upward movement of rack 44.

As already stated, reciprocation of slide 28 and actuation of the feeding mechanism are produced by rotation of shaft 20. Said shaft 20, in the form shown, is provided with two pairs of cams for actuating the two ball making devices which are illustrated. Cams 50, 50' actuate the feed mechanism, and cams 51, 51' operate the slides carrying the die plates.

Slide bar 52, having a roller 53 to follow cam 50 communicates its movement to the elbow lever 54 comprising arms $54^a$ and $54^b$, and the link bar 55 connects lever arm $54^b$ to rack 44. Spring 56 raises rack 44 and tends to hold roller 53 up to cam 50. By moving stop 48 up or down, the extent of movement of rack 44 can be regulated. Lowering stop 48, for example, causes it to stop the upward movement of rack 44 under the influence of spring 56, and consequently reduces the length of the down stroke to the same extent. Thus raising stop 48 gives increased movement of gears 33, 33' and therefore increased feed, and by lowering stop 48 the feed of cotton to the spindle is reduced.

Cam 51' actuates elbow lever 57 comprising arms $57^a$ and $57^b$, the former having a roller 58 to follow the cam. Arm $57^b$ of lever 57 enters the opening 60 in slide 28 and imparts reciprocatory movement to the slide. Cam 51 actuates elbow lever 57' and the second slide in a similar manner. That the cams 51, 51' are arranged at the relative angle shown is due to the overlapping of the arms of levers 57 and 57' and to the angular relations thereof, but various other forms and arrangements of parts may be resorted to, so long as the desired motion and timing is obtained.

Means are provided for ejecting the completed balls. In the device illustrated, the ejecting device is actuated by the movement of the die slide. An elbow lever 61 comprising arms $61^a$ and $61^b$ is mounted on the machine bed. Arm $61^a$, which is normally held in elevated position by spring 62, is provided with a punch 63 adapted to enter the hole 26 in the die plate 25, when the lever arm $61^b$ is struck by the adjacent end of slide 28 during the reciprocating movement thereof and to eject the ball B from the die. Punch 63 is over the discharge chute 64, into which the balls fall as they are ejected from the die plate. A receptacle may be placed under the chute to receive the balls. It will be understood that the balls are coated with suitable material to imitate fruit, but this forms no part of the present invention which is directed to the production of the balls.

Means for supplying cementitious material, as glue solution, to the die hole and spindle are provided. The glue pot 65 serves for this purpose. Its spout 66, controlled by valve 67, is arranged over the groove 68 leading to the hole 26 in the die plate, by which the glue is supplied to the cotton or other fibrous material as it is spun into a ball.

As rack 44 is moved downward by cam 50 from its position in contact with stop 48, the feed gears 33, 33' are turned to an extent dependent upon the height at which stop 48 is placed. The roll of cotton 34 is thereby fed toward the spindle 23 and the frayed ends and threads thereof are engaged with and wound upon the rapidly rotating spindle 23, turning in the hole 26. When sufficient cotton has been fed to make the ball of the desired size the feed gears 33, 33' stop turning, rack 44 having reached its lowermost position, and the spindle 23 continuing to rotate, the roll of cotton is broken or torn off by the pulling action of the spindle, leaving the frayed out ends so produced in the best possible form to be picked up by the spindle when the making of the next ball is to be started.

The cotton delivered to spindle 23 having been formed into a ball of the desired form by being rotated in contact with the walls of the opening 26, the slide 28 is moved away from the spindle, leaving an opening in the ball for insertion of the fruit stem, and the ball B coming over the chute 64 is ejected by punch 63. Slide 28 is now returned to working position as shown in Fig. 4. The rack 44 having meanwhile been raised into contact with stop 48 without producing any feeding action, the pawl 43 riding over the ratchet wheel, is again moved down producing the feeding action, and this series of operations is continued indefinitely in a substantially completely automatic fashion, practically no attention being required except the renewal of cotton and glue from time to time.

It will be seen that a great increase of production and a similarly great reduction of cost is obtained, since the operation is both rapid and automatic one man can tend a number of machines.

By feeding the fibrous material to the spindle intermittently as described, stopping the feed when a sufficient quantity of material has been fed, and utilizing the pulling action of the spindle to separate the material used from that remaining, the fibrous material is left in the best possible condition for engagement by the spindle when the feeding movement is resumed, and I consider the process, including these steps, an important part of my invention.

The construction shown and described is for illustration only and not for limitation of the invention, and numerous changes and modifications can be resorted to without departing from my invention.

I claim:

1. In apparatus for making balls of fibrous material, a rotatable spindle, a movable die having an aperture into which said spindle is adapted to project an automatic means for ejecting balls from the die aperture.

2. In apparatus for making balls of fibrous material, a rotatable spindle, a movable apertured die into which said spindle normally projects, and means for ejecting balls from the aperture in the die and operable upon movement of the die away from the spindle.

3. In apparatus for making balls of fibrous material, a rotatable spindle, an apertured die movable to and from the spindle, and means for ejecting balls from the die aperture actuated by movement of the die relative to the spindle.

4. In apparatus for making balls of fibrous material, a rotatable spindle, an apertured die, and means actuated by movement of the die relative to the spindle for ejecting balls from the aperture in the die.

5. In apparatus for making balls of fibrous material, a rotatable spindle, a die having a hole into which the spindle projects, and automatic means for feeding measured quantities of fibrous material to the spindle.

6. In apparatus for making balls of fibrous material, a rotatable spindle, a die having a hole into which the spindle is adapted to project, and means for intermittently feeding measured quantities of fibrous material to the spindle.

7. In apparatus for making balls of fibrous material, a rotatable spindle, means for defining the form of material wound on the spindle, and regulable means for intermittently feeding measured quantities of fibrous material to the spindle.

8. In apparatus for making balls of fibrous material, an apertured die, means for forming balls within the die, and automatically operated means for ejecting balls from the die.

9. In apparatus for making balls of fibrous material, an apertured die, a rotating spindle adapted to project within the aperture of the die, and a feeding apparatus for feeding fibrous material thereto, comprising a pair of gears.

10. In apparatus for making balls of fibrous material, a rotating spindle, feeding apparatus for intermittently feeding fibrous material thereto, including a pair of gears and means for imparting intermittent rotation to said gears.

11. In apparatus for making balls of fibrous material, a rotating spindle, a pair of gears between which fibrous material is passed and fed to the spindle, and means for imparting intermittent rotation to the gears, including a rack and pawl and ratchet mechanism.

12. In apparatus for making balls of fibrous material, a stationary rotatable spindle, a reciprocable slide and means for actuating same, an apertured die plate removably secured to said slide and having a bore substantially in line with the spindle and extending into the aperture, means for feeding fibrous material within the die aperture to the spindle, and means for feeding cementitious material into contact with the fibrous material.

13. Automatic mechanism for making balls of fibrous material, comprising a rotatable stationary spindle, a slide movable toward and away from the spindle, an apertured die removably held in said slide and having a bore in line with the spindle and communicating with the aperture, means for feeding fibrous material to the spindle within the die aperture, and means for feeding cementitious material into contact with the fibrous material.

14. The process of making balls of fibrous material, which includes the steps of delivering fibrous material in the form of a continuous cord or roll to a rotating spindle, and utilizing the pulling action of the spindle for separating the fibrous material used from the cord or roll.

15. The process of making balls of fibrous material which includes the steps of feeding a roll or cord of the fibrous material to a rotating spindle, stopping the feed and utilizing the pulling action of the rotating spindle for pulling or tearing the fibrous material from the remainder of the cord or roll whereby the frayed ends left are readily engaged by the spindle upon again being fed thereto.

16. The process of making balls of fibrous material, which includes the step of utilizing a rotating spindle to pull off the fibrous material used from the remainder thereof, whereby a loosely frayed end is left adapted to be readily engaged by the spindle.

17. A machine for making cotton molds including a revoluble spindle, means to shape the cotton as it is wound on the spindle, means to feed the cotton to the spindle, means to intermittently operate said feed means, and means to revolve the spindle beyond the period of feed for causing the spindle to tear off the cotton at the feed means.

18. A machine for making cotton molds including a means to wind and shape strip cotton into mold form, and means to feed the cotton to the first-mentioned means, said feed means including a driven roller and coacting roller, drive means, a vertically movable rack bar, a gear train for turning the driven roller by the movements of said rack bar, and means to actuate said rack bar from the said drive means.

19. A machine for making cotton molds including a means to wind and shape strip cotton into mold form, and means to feed the cotton to the first-mentioned means, said feed means including a driven roller and a coacting roller, drive means, a vertically movable rack bar, a gear train for turning the driven roller by the movements of said rack bar, and means to intermittently actuate said rack bar from said drive means.

20. A machine for making cotton molds including a means to wind and shape strip cotton into mold form, and means to feed the cotton to the first-mentioned means, said feed means including a driven roller and a coacting roller, drive means, a vertically movable rack bar, a gear train for turning the driven roller by the movements of said rack bar, a bellcrank lever operatively connected by one arm with said rack bar, and a slide adapted to engage the other arm of said lever and adapted to be actuated by said drive means.

21. In a machine of the class described, means to form strip cotton into a ball and automatic means to dislodge the ball from the forming members and cause the ball to move away from the position in which it is formed.

22. A machine for making molds of fibrous material, including a revoluble spindle, means to shape the fibrous material as it is wound on the spindle, means for intermittently feeding the fibrous material to the spindle, means to revolve the spindle beyond the period of feed to cause the fibrous material to be torn off the feed means, and means for feeding cementitious material to the fibrous material after the latter has passed the feed means.

23. A machine for making artificial fruit bodies of fibrous material, including a revoluble spindle to which the fibrous material is supplied, means to shape the fibrous material as it is wound on the spindle, means for feeding cementitious material to the fibrous material, means for moving the shaping means and spindle relative to one another to free the formed fruit body from the spindle, and means for automatically ejecting the formed body from the shaping means.

24. A machine for making artificial fruit bodies of fibrous material, including a revoluble spindle, means for feeding the fibrous material to said spindle, means to shape the fibrous material as it is wound on the spindle, means for applying cementitious material to the fibrous material fed to the spindle, means for moving the shaping means and spindle relative to one another to free the formed fruit body from the spindle, and means for automatically ejecting the formed body from the shaping means.

25. A machine for making artificial fruit bodies of fibrous material, including a revoluble spindle, means for feeding the fibrous material to said spindle, means to shape the fibrous material as it is wound on the spindle, means for applying cementitious material to the fibrous material fed to the spindle, means for moving the shaping means and spindle relative to one another to free the formed fruit body from the spindle, and a knocker brought into operation upon such relative movement for automatically ejecting the formed and freed bodies from the shaping means.

In testimony that I claim the foregoing, I have hereto set my hand, this 21st day of January, 1920.

CARLO DE-FELICE.